United States Patent [19]

Horikawa et al.

[11] Patent Number: 5,188,779
[45] Date of Patent: Feb. 23, 1993

[54] PRODUCTION OF CERAMIC HONEYCOMB STRUCTURAL BODIES

[75] Inventors: Osamu Horikawa, Toyoake; Toshihiko Hijikata, Nagoya, both of Japan

[73] Assignee: NGK Insulators, Ltd., Japan

[21] Appl. No.: 672,107

[22] Filed: Mar. 19, 1991

[30] Foreign Application Priority Data

Mar. 27, 1990 [JP] Japan ................................ 2-75602

[51] Int. Cl.⁵ .............................................. C04B 41/61
[52] U.S. Cl. ........................................ 264/62; 267/67
[58] Field of Search ................................ 264/62, 67

[56] References Cited

U.S. PATENT DOCUMENTS 3,876,556  4/1975  Laack et al. ..................... 252/437
4,448,833  5/1984  Yamaguchi et al. ............. 428/116
4,840,827  6/1989  Mizutani et al. ................. 428/116

FOREIGN PATENT DOCUMENTS 0221515   5/1987  European Pat. Off. .
0283224   9/1988  European Pat. Off. .
0295343  12/1988  European Pat. Off. .
1-176285  7/1989  Japan .
2071639   9/1981  United Kingdom .
2071640   9/1981  United Kingdom .

OTHER PUBLICATIONS

McKinney, Effect of Surface Finish on Structural Ceramic Failure, Journal of the American Ceramic Society, vol. 53, No. 9 Sep. 1970 pp. 513-516.

Primary Examiner—James Derrington
Attorney, Agent, or Firm—Parkhurst, Wendel & Rossi

[57] ABSTRACT

A process for producing a ceramic honeycomb structural body includes the steps of: producing a ceramic honeycomb fired body by shaping a ceramic material by extrusion, and drying and firing the shaped body; removing a peripheral portion of the ceramic honeycomb fired body by working; and forming an outer wall portion around an outer peripheral surface of the worked ceramic honeycomb fired body.

5 Claims, 2 Drawing Sheets

PRODUCTION OF CERAMIC HONEYCOMB STRUCTURAL BODIES

BACKGROUND OF THE INVENTION

Field of the Invention

The present invention relates to a process for producing ceramic honeycomb structural bodies. Particularly, the invention relates to a process for producing large scale honeycomb structural bodies to be used for removing fine particulates from diesel engines, and thin wall or dense ceramic honeycomb structural bodies to be used as catalyst carriers for purifying automobile exhaust gases.

Related Art Statement

Final ceramic structural bodies have been formerly produced as follows:

A ceramic material is obtained through formulation by mixing a cordierite powder or a cordierite-forming powder with a shaping aid or a pore-forming agent, and a ceramic shaped body is produced by extruding the ceramic material, and dried. Then, the final ceramic honeycomb structural body is obtained by firing the thus obtained ceramic honeycomb structural body at not more than a given temperature in a continuous furnace (tunnel furnace) or an independent furnace.

However, when a large scale honeycomb shaped body having, for example, a diameter of not less than 190.5 mm and a length of 203.2 mm (hereinafter referred to as "large honeycomb") for use in removing fine particulates from diesel engines or a thin wall type ceramic honeycomb shaped body having a cell thickness of not more than 0.152 mm (hereinafter referred to as "thin wall honeycomb") is to be produced, the honeycomb cannot support its self-weight on extrusion-shaping due to too great a self weight or insufficient strength of the shaped body itself. Consequently, it happens that the cells in the outer peripheral portion of the shaped body are collapsed or deformed in a bent form, and desired strength cannot be attained even after firing. On the other hand, as in the case of a dense ceramic honeycomb shaped body in which porosity is decreased to increase the strength of the product (hereinafter referred to as "dense ceramic honeycomb"), when a material having a large shrinkage factor is used, the circularity of the product is deteriorated on firing to damage the dimensional precision.

Japanese patent application Laid-open No. 53-133,860 discloses a ceramic honeycomb structural body having a glaze layer on the outer peripheral surface of the outer wall so as to improve strength of the product. This product is produced by drying a ceramic honeycomb shaped body, forming a glaze layer by spray coating, and firing the glazed honeycomb shaped body. However, even when the glaze layer is additionally formed on the ceramic honeycomb shaped body having the cells deformed at the peripheral portion, a product having desired strength still cannot be obtained. Further, when the ceramic material has a great shrinkage factor as in the case of the dense honeycomb shaped body, it is still deformed after the firing.

In addition, Japanese Utility model Registration application No. 62-37,125 discloses a ceramic honeycomb structural body having a coated outer peripheral surface to improve the dimensional precision of the ceramic honeycomb structural body. This technique is to improve the dimensional precision of the structural body by the steps of obtaining a ceramic honeycomb shaped body having a dimension smaller than an intended one through extrusion, drying or firing the shaped body, and then providing a coating layer on the other periphery of the shaped body. However, the intended product strength of the product still cannot be obtained eve by forming the coating layer onto the ceramic honeycomb shaped body having the outer peripheral portion deformed, although the dimensional precision is improved.

SUMMARY OF THE INVENTION

It is an object of the present invention to provide a process for producing ceramic honeycomb structural bodies, which process can improve mechanical strength, circularity and dimensional precision of the ceramic honeycomb structural bodies.

The present invention relates to a process for producing ceramic honeycomb structural bodies, comprising the steps of obtaining a ceramic honeycomb fired product by shaping a ceramic material through extrusion, and drying and firing the shaped body; removing a peripheral portion of the ceramic honeycomb fired product by working; and forming an outer wall portion on an outer peripheral surface of the worked ceramic honeycomb fired body.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Examples of the producing process of the present invention will be explained below.

Figure 1:
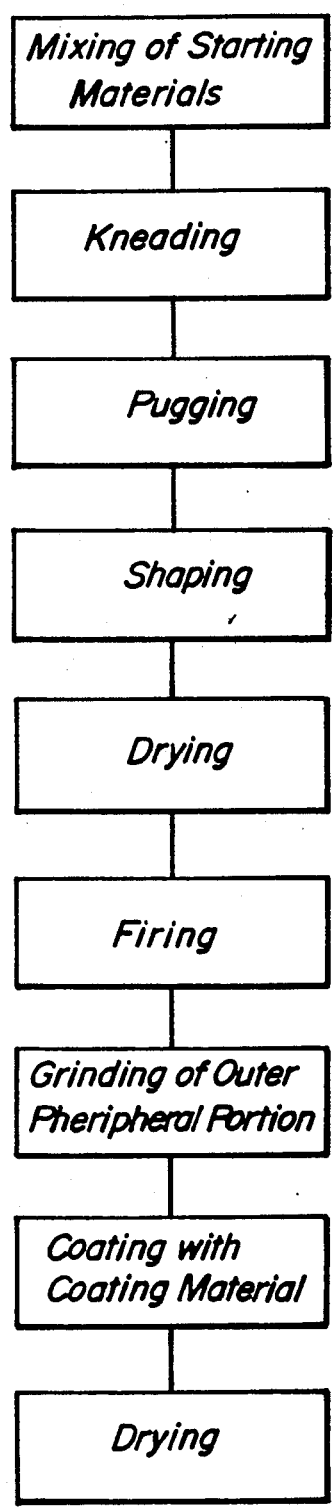
FIG. 1 is a flow chart illustrating the process for producing the ceramic honeycomb structural bodies according to the present invention.

FIG. 1 is a flow chart for illustrating an example of the process for producing the ceramic honeycomb structural bodies according to the present invention.

First, a shaping aid and/or a pore-forming agent is added into and mixed and kneaded with a cordierite-producing material so as to plasticize the resulting ceramic material to be shaped by extrusion. Then, a ceramic honeycomb shaped body is obtained by shaping the ceramic material through extrusion. The cordierite-producing material forms a low expansion cordierite ceramic on firing, and is composed of fine talc, kaoline, alumina and another cordierite-producing materials. It is particularly preferred that the fine powder of talc used is one having a low content of an alkaline component. Further, in order to make talc and kaoline fine, it is preferable to use calcined talc and calcined kaoline, which use can effectively control occurrence of cracks in honeycomb structural bodies due to shrinkage on drying and firing. Their grain size is preferably the same as that of non-calcined talc and kaoline.

As the shaping aid, an appropriate one is selected depending upon use, for example, among organic binders such as methyl cellulose, carboxymethyl cellulose, polyvinyl alcohol, starch glue, wheat powder, and glycerin, a surface active agent and wax. As the pore-forming agent, an appropriate one is selected preferably, for example, among graphite, starch powder and sawdust.

The state of the ceramic honeycomb extrusion-shaped body will be explained below.

Figure 2:
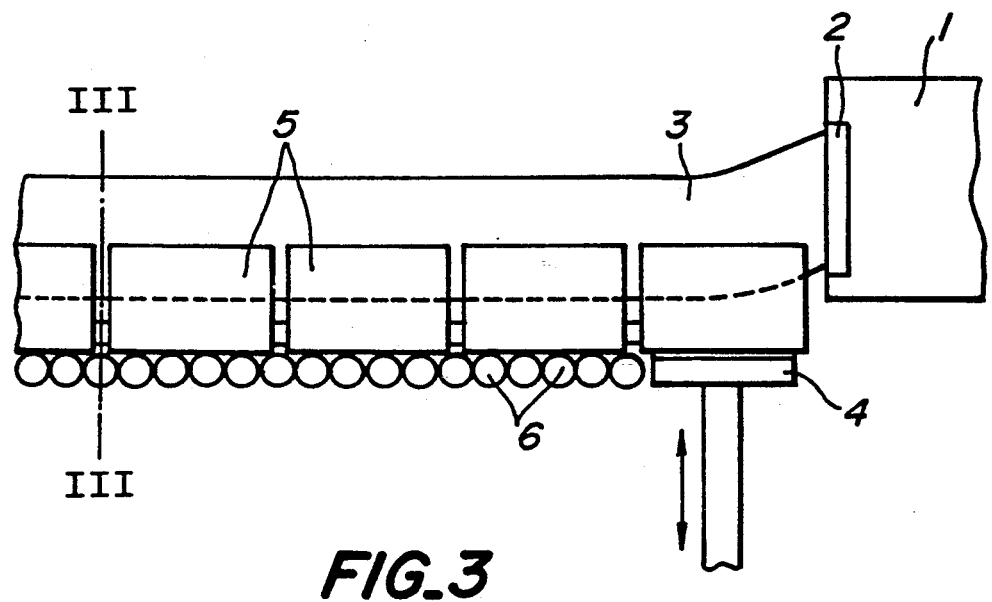
FIG. 2 is a schematic view illustrating a state in which a ceramic material is shaped by extrusion through a die of a plunger type shaping machine.

As shown schematically in FIG. 2, a ceramic material is continuously extruded through a die 2 of a plunger type shaping machine 1 to obtain a long ceramic honeycomb shaped body 3 by extrusion. With the extrusion, receiving tables 5 are successively supplied near the die 2 by vertically moving a receiving table-feeding unit 4 as shown by arrows, so that the the ceramic honeycomb shaped body 3 is received on the tables 5, and moved left by a roller conveyor 6 as shown in FIG. 2.

Figure 3:
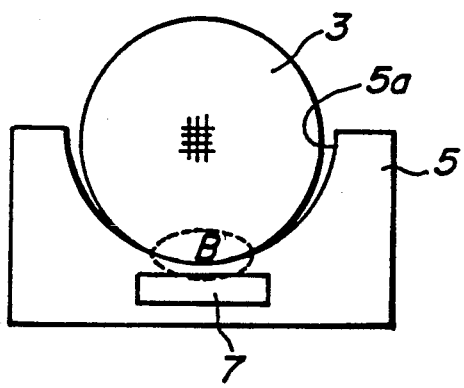
FIG. 3 is a sectional view of FIG. 2 taken along the III—III line shown in FIG. 2.
Figure 4:
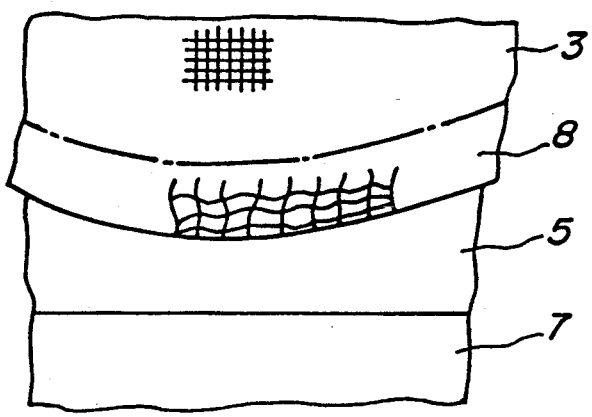
FIG. 4 is a enlarged view of a portion B shown in FIG. 3.

FIG. 3 shows a sectional view of the honeycomb shaped body including the receiving table taken along the line III—III shown in FIG. 2 for the ceramic honeycomb shaped body 3. As shown, the ceramic honeycomb shaped body 3 is stably placed inside a channel 5a of the receiving table 5. In FIG. 3, a reference numeral 7 is a spacer lying between the tables 5. FIG. 4 is an enlarged view of a portion B shown in FIG. 3. As shown, a number of deformed cells 8 in which partition walls are bent are formed in a peripheral portion 10 of the ceramic honeycomb shaped body 3.

In the present invention, the ceramic honeycomb fired body is then produced by drying and firing the ceramic honeycomb shaped body.

Next, the peripheral portion of the ceramic honeycomb fired body is removed by working, preferably by grinding, to make the size of the fired body smaller than an intended size. Finally, the outer peripheral surface of the ceramic honeycomb fired body having the outer peripheral portion removed is coated with a coating material, which is dried to cure the coating material and produce the ceramic honeycomb structural body having the intended size.

When the peripheral portion of the ceramic honeycomb fired body is removed by working, it is preferable that the peripheral portion of the fired body is removed by a thickness corresponding to two or more cells from the outer peripheral surface, more preferably by a thickness corresponding to two to four cells.

Since the peripheral portion of the ceramic honeycomb fired body is removed by grinding in the process for producing the ceramic honeycomb structural body according to this example, the deformed cells existing in this peripheral portion can be removed. Further, even if the circularity of the entire ceramic honeycomb fired body is small, the circularity and the dimensional precision can be increased by grinding.

Furthermore, since the outer wall portion is formed by the steps of removing the deformed cells through grinding, coating the coating material onto the outer peripheral surface of the ground ceramic honeycomb body, and drying the coating material, mechanical strength of the ceramic honeycomb structural body can be increased.

Moreover, since the coating material is not fired, the dimensional change or the deterioration in the circularity of the ceramic honeycomb structural body due to firing of the coating material can be avoided.

As mentioned above, it is desired that no firing is effected after the outer peripheral surface of the ceramic honeycomb fired body is coated with the coating material. However, such firing may be necessary depending upon uses. That is, the honeycomb fired body coated with the coating material may be fired in a case where high thermal shock resistance is demanded, and a dimensional change of the structural body due to firing is small.

The outer peripheral surface of the ceramic honeycomb fired body is ground preferably by means of a grinding stone at a peripheral speed of 750 to 2,100 m/min, more preferably 1,300 to 1,500 m/min of the grinding stone. If the peripheral speed is less than 750 m/min, it takes a long time to grind, so that the cost of the product unnecessarily increases. If the grinding speed is more than 2,100 m/min, it is feared that the ceramic honeycomb fired body will be cut or broken, and a desired dimensional precision will not be obtained.

The grinding is effected preferably at a grinding speed of 0.7 to 0.9 mm/sec. If the grinding speed is less than 0.7 mm/sec, the working time unfavorably becomes longer. On the other hand, if it is more than 0.9 mm/sec, pitching problems occur to shorten the service life of the grinding stone.

When ceramic fiber and an inorganic binder are used as the coating material, strength of the outer wall portion of the ceramic honeycomb structural body can be increased. Moreover, a material similar to the base material of the ceramic honeycomb structural body, for example, cordierite powder, is preferably added into the coating material, because differences in thermal expansion between the main body of the honeycomb structural body and the coating layer can be reduced. Further, it is preferable to set the viscosity of the coating material at 100 to 200 poises. If the viscosity is less than 100 poises, the coating material is absorbed into the porous ceramic honeycomb structural body, so that the use amount of the coating material increases to raise the cost of the product. If the viscosity of the coating material is more than 200 poises, it is likely that the coating material is not uniformly spread over the outer periphery of the structural body, and that the dimensional precision is deteriorated.

As the coating material, for example, it is preferable to use "FIBERFRAX QF-180 (or QF-150) coating cement"or "FIBERFRAX QF-180 FP coating cement" (Cold area type, anti-freeze mixed) (both being produced by Toshiba Monoflux Co., Ltd.) in combination with cordierite serben. Each of the above cordierite cements is composed of ceramic fibers and an inorganic binder. The cordierite serben serves as aggregate for the cordierite cement. The average particle diameter is preferably 2–8 μm.

In the following, an example will be explained.

Talc, kaoline and alumina were mixed as a cordierite-producing material in their respective given amounts into which water and a binder were added and kneaded. Then, a column-shaped body was shaped by a vacuum pug mill. The column-shaped body was fed into a plunger type shaping machine, and shaped into a ceramic honeycomb shaped body having a diameter of 123 mm at 4 mil/400 cpi² through an extruding die. At that time, cells in the outer peripheral portion located from the outer peripheral surface by a thickness corresponding to about 2 cells were deformed along a surface of the ceramic shaped body contacting the receipt table due to the self-weight of the ceramic material. This ceramic honeycomb shaped body was dielectrically dried, and fired to obtain a ceramic honeycomb fired body having a diameter of 110 mm.

Next, the outer peripheral portion of the ceramic honeycomb fired body was ground off to attain a diameter of 101 mm with an outer periphery grinder by about 4.5 mm (by a thickness corresponding to 3 cells) from the outer peripheral surface, thereby removing the deformed cells. Then, the entire peripheral surface of the ground ceramic honeycomb fired body was coated with a coating material having the following composition, which was dried at 93° C. for one hour and at 120° C. for 2 hours to obtain a ceramic honeycomb structural body having a diameter of 101.6 mm.

| Grinding conditions: | |
|---|---|
| Peripheral speed of grinding stone | 1,500 m/min |
| Grinding speed | 0.9 mm/sec |
| Coating material: | |
| Viscosity | 150 poises |
| Composition: | |
| 75 wt% QF-180FP coating cement ($SiO_2$ 60.0 wt %, $Al_2O_3$ 39.2 wt %, $Na_2O$ 0.4 wt %, MgO 0.3 wt %, other inorganic material 0.1 wt %, and anti-freeze liquid) and 25 wt % cordierite (grain diameter 2 $\mu$m)). | |

Another ceramic honeycomb fired body was produced as a conventional product, which did not undergo the above peripheral portion-grinding step or coating material coating-drying step. With respect to both the conventional product and the invention product, isostatic strength was measured. More specifically, each of the conventional product and the invention product was sealingly enveloped with a rubber mold, which was then placed in an autoclave vessel filled with water. Then, while pressure inside the autoclave was gradually increased, pressure at which a breaking sound occurred was taken as strength of the ceramic honeycomb structural body.

As a result, the conventional product was broken under a pressure of about 7.0 kg/cm², whereas the invention product was not broken until about 26 kg/cm².

The present invention is not limited to the above-mentioned example, but various modifications, variations and changes could be made. Although the ceramic honeycomb structural body had an accurately circular radial section in the above example, the invention is not limited thereto. For example, the radial section of the honeycomb structural body may be elliptical, rectangular or other asymmetrical shape.

Further, although the sectional shape of the cells is square in the above example, this is not restrictive. For example, the shape of the cell may be triangle, hexagonal etc.

In addition, although cordierite is used as the material in the above example, this is not restrictive. Furthermore, the invention may be applied to a honeycomb structural body in which opposite end faces of cells are alternatively closed.

According to the process for producing the ceramic honeycomb structural bodies in the present invention, since the peripheral portion of the ceramic honeycomb fired body is removed by working, the deformed cell existing there can be removed. Further, even when the ceramic honeycomb fired structural body totally has low circularity, its circularity can be increased by the above working to improve the dimensional accuracy.

Furthermore, since the deformed cells having low strength are removed by working and then the outer peripheral wall is formed around the outer peripheral surface of the ceramic honeycomb fired body, mechanical strength of the ceramic honeycomb structural body can be highly increased. As a result, sufficient strength can be imparted upon conventional fired products having insufficient strength due to deformation of cells in the peripheral portion by the producing process according to the present invention, so that the yield of products can be increased.

What is claimed is:

1. A process for producing a ceramic honeycomb structural body, comprising the steps of:
    obtaining a ceramic honeycomb fired body by shaping a ceramic material by extrusion, and drying and firing the shaped body;
    removing deformed through-hole cells from a peripheral portion of the ceramic honeycomb fired body by working to provide a worked ceramic honeycomb fired body; and
    forming an outer wall portion around the outer peripheral portion removed by working.

2. The producing process according to claim 1, wherein the outer wall portion is formed by coating the outer peripheral surface of the ceramic honeycomb fired body with a coating material after the working and then drying the coating material.

3. The producing process according to claim 2, wherein the outer peripheral surface of the ceramic honeycomb fired body is coated with the coating material containing a ceramic powder, ceramic fibers and a binder.

4. The producing process according to claim 2 or 3, wherein a viscosity of the coating material used for the coating is not less than 100 poises and not more than 200 poises.

5. The producing process according to claim 1, wherein the peripheral portion of the ceramic honeycomb fired body is removed by grinding off said outer periphery with a grinding stone at a peripheral speed of 750 to 2,100 m/min and at a working speed of 0.7 to 0.9 mm/sec.

* * * * *